United States Patent [19]
Paolercio et al.

[11] Patent Number: 5,388,750
[45] Date of Patent: Feb. 14, 1995

[54] SOLDERING MACHINE FOR ROPE CHAIN

[75] Inventors: Anthony Paolercio, Pelham Manor; Bolivar Santacruz, Ozone Park, both of N.Y.

[73] Assignee: Michael Anthony Jewelers, Inc., Mt. Vernon, N.Y.

[21] Appl. No.: 179,602

[22] Filed: Jan. 10, 1994

[51] Int. Cl.[6] .................... B23K 31/02; B23K 3/00
[52] U.S. Cl. ........................... 228/4.1; 228/33; 228/45; 59/16
[58] Field of Search .............. 228/4.1, 33, 41, 45, 228/43, 248.1, 902; 59/3, 16, 25, 31; 29/160.6; 219/51, 52

[56] References Cited

U.S. PATENT DOCUMENTS

| | | | |
|---|---|---|---|
| 1,669,846 | 5/1928 | Wenz et al. | 228/33 |
| 3,198,930 | 8/1965 | Glendenning et al. | 219/52 |
| 3,325,991 | 6/1967 | Glendenning | 59/35.1 |
| 4,298,154 | 11/1981 | DeFusco | 228/49.1 |
| 4,442,150 | 4/1984 | Greiner et al. | 29/469 |
| 4,718,592 | 1/1988 | Grotto et al. | 228/47.1 |
| 5,115,959 | 5/1992 | Weinberg et al. | 228/4.1 |

Primary Examiner—Samuel M. Heinrich
Attorney, Agent, or Firm—Edgar H. Haug; Mark Montague

[57] ABSTRACT

An improved soldering machine for automatically soldering links of a chain is provided in which the links are disposed adjacent to one another and define link junctions where the improved soldering machine holds the chain in position to enable the link junctions to be soldered. A soldering device applies solder paste to the chain at the link junctions by feeding the solder paste through a hollow needle having a needle tip wherein the needle tip traverses a predetermined path and contacts the chain over a portion of that predetermined path. The improvement consists of a heater which traverses a cyclical path which is dependent upon the position of the needle tip and heats the solder applied to the chain over a portion of that cyclical path.

13 Claims, 7 Drawing Sheets

FIG_1

FIG_5(a)

FIG_5(b)

FIG_5(c)

FIG_5(d)

FIG. 7

SOLDERING MACHINE FOR ROPE CHAIN

BACKGROUND OF THE INVENTION

The present invention generally relates to an improved machine for use in connection with the fabrication of jewelry, specifically rope chains and more particularly relates to an automatic soldering machine for automatically applying solder paste to rope chains and automatically heating the solder paste.

A rope chain is a chain in the form of a rope constituted by a helical series of open rings that are interlinked with one another to define a configuration similar to a continuous double-stranded rope.

Prior machines of the general character indicated are exemplified by Tega et al., U.S. Pat. No. 4,127,987,; Tega, U.S. Pat. No. 4,311,9001, and Allazzetta et al., U.S. Pat. No. 4,503,664. Allazzetta et al. is specifically directed to a machine by which the fabrication of rope chains is automated. The subject patent notes that linking the open rings found in a rope chain requires great dexterity, manual agility and uninterrupted concentration on the part of the workmen. It further notes that the production of these chains by hand involves long periods of time and consequently is very labor-intensive and leads to a high selling price.

The Allazzetta rope chain fabricating machine and, indeed, several earlier machines have concentrated on automating the process of assembling and interlinking the open rings of a rope chain, in a manner which imparts to the rope chain its characteristic look. The shape of the rope chain is maintained in these machines by reinforcing wires which are threaded through the chain.

In the known production process, subsequent to the automatic assembling of the chain, solder paste is manually or automatically applied between pairs of adjacent rings of the rope chain, the chain is manually heated and the solder sets. Thereafter, the reinforcing wires are removed.

Weinberg et al., U.S. Pat. No. 5,115,959, to which the improvement of the present invention is directed and which is incorporated herein by reference is specifically directed to a machine by which the soldering operation is automated.

Figure 1:
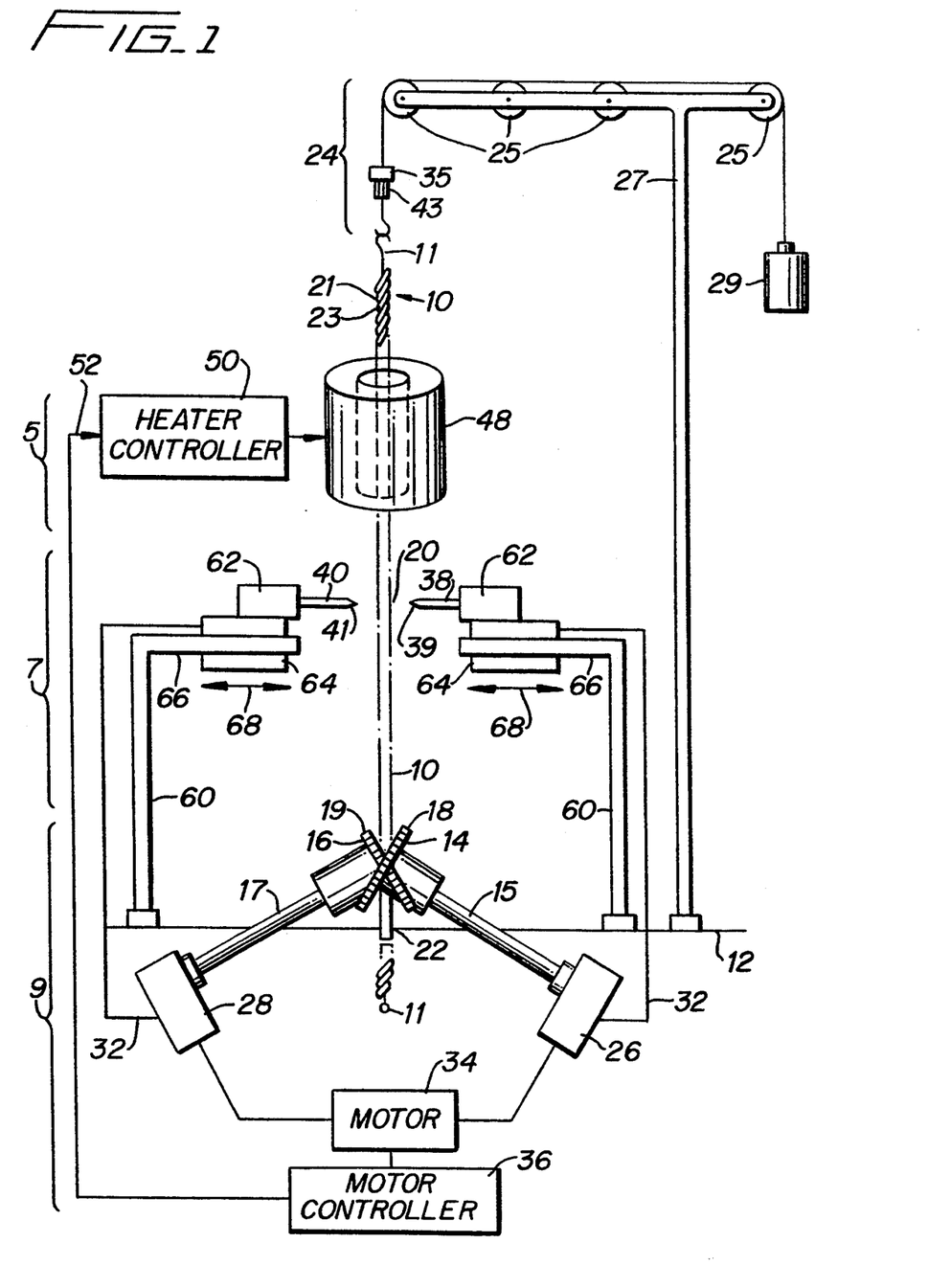
FIG. 1 is a schematic block diagram of a known soldering system.
Figure 2A:
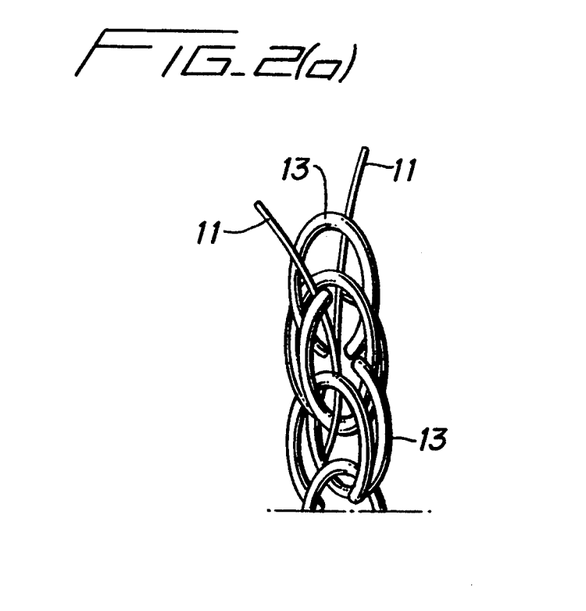
FIGS. 2(a) and 2(b) show a rope chain during successive stages of its fabrication.
Figure 2B:
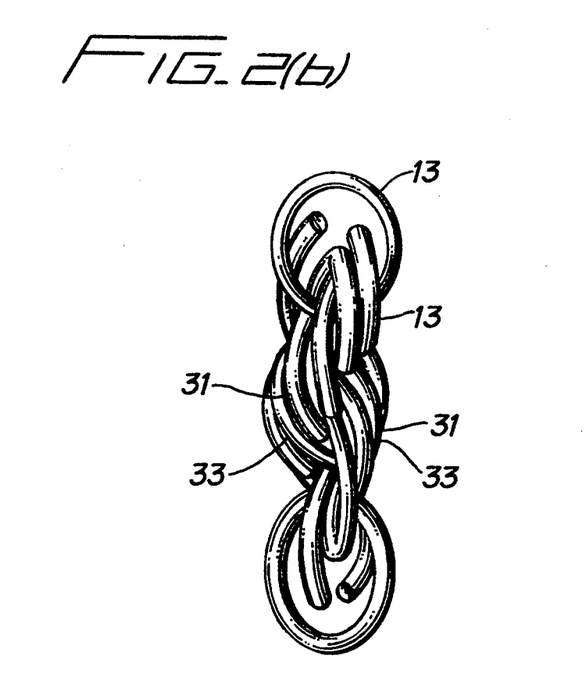

Specifically, Weinberg et al. is directed to a mechanism for feeding and soldering a rope chain 10 (FIG. 1) in the form of a rope constituted by a helical series of open rings 13 (FIGS. 2(a) and 2(b)), in which adjacent rings 13 are interlinked to define a configuration similar to a continuous double-stranded rope. More specifically, it is comprised of a first, continuous strand of links 21 intertwisted with a second continuous strand 23. The rope chain 10 is preassembled, either manually or automatically, by forming, feeding and interlinking the rings 13 and the shape thereof is temporarily maintained by reinforcing wires 11 which are threaded through it. Thereafter, the open rings 13 are soldered to one another and the reinforcing wires 11 are removed, enabling the chain 10 to maintain its characteristic rope chain shape.

Thus, in the soldering machine described by Weinberg et al., a preassembled, unsoldered rope chain 10 (FIG. 2(a) and 2(b)) is fed as shown in FIG. 1 to emerge above a platform 12 which supports a rope chain feeding mechanism 9 for feeding the rope chain 10. After each stepped advancement of the rope chain 10, a first and second solder-applying hollow needle 38 and 40 is moved laterally to apply a controlled, measured amount of solder paste to the rope chain 10, on diametrically opposed sides thereof and precisely at the link junction 31, 33, etc. that are at that instant positioned at the soldering position 20 adjacent the hollow needles 38 and 40.

For ease of presentation, the needles 38 and 40 have been drawn in FIG. 1 at an exaggerated distance away from the gears 14 and 16, whereby their respective needle tips 39 and 41 are able to contact the rope chain at a solder position 20 which is located at or very near the point where the chain is engaged by the gears 14 and 16.

With the needles 38 and 40, a first dab of solder is applied at a link junction 31 on the first strand 21 and a second dab of solder is applied to the link junction 31 on the second strand 23.

In a known soldering machine similar to the soldering machine disclosed in Weinberg et al., the rope chain 10 is advanced (and soldered) until a portion of the rope chain 10 which contains unheated solder reaches a predetermined height, at which point, the advancing and soldering operations are halted. When the soldering machine has stopped advancing the rope chain 10, an operator of the soldering machine heats (or "burns") that portion of the rope chain which contains unheated solder with a blow torch until the solder flows and sets, securing the rings to one another. The manual operation of heating the rope chain 10 takes approximately three to five minutes and upon completion of manual heating, the operator pushes a button on a control panel (not shown), causing the soldering machine to repeat the above described operation of advancing and soldering the rope chain.

A rope chain pulling system 24 for the above-described soldering machine comprises pulleys 25, a support 27, a weight 29, and a coupling 35. The lower portion 43 of the coupling 35 is rotatable relative to its upper portion enabling the system 24 to pull the rope chain and maintain it taut while it is being slowly rotated by the feeding mechanism 9.

In the above described soldering machine, a soldering station 7 (FIG. 1) has a pair of L-shaped brackets 60 which are secured at one end thereof to the platform 12. The solder-applying needles 38 and 40 are coupled to solder paste reservoirs 62 that are secured to reciprocally movable blocks 64, which slide on the short arms 66 of the brackets 60 in the directions indicated by the arrows 68.

Figure 3:
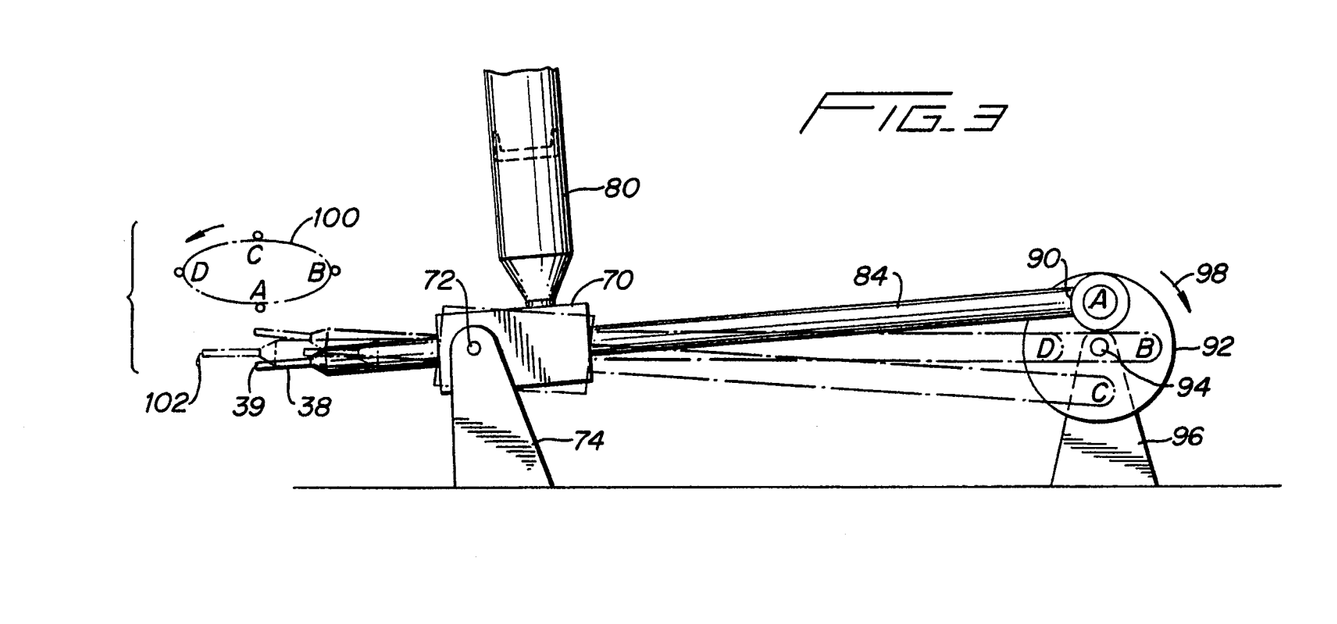
FIG. 3 is a side view of a known moving mechanism for a solder-applying device.
Figure 4A:
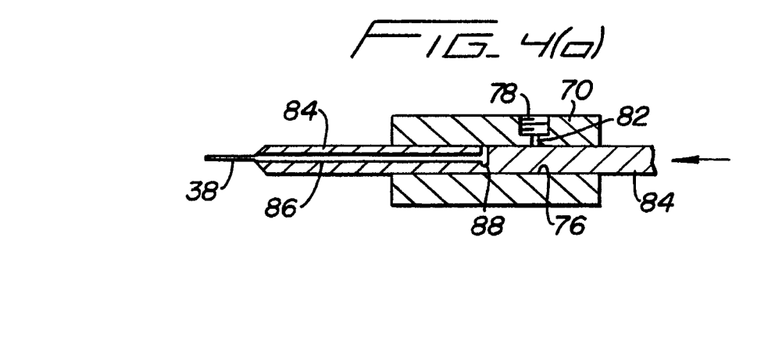
FIGS. 4(a) and 4(b) are cross-sections showing details of a portion of FIG. 3.
Figure 4B:
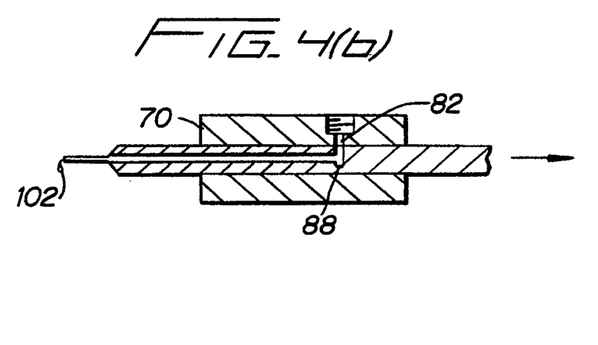

FIGS. 3, 4(a) and 4(b) illustrate the soldering mechanism 7 which includes a shell 70 pivotally supported by laterally extending hinge pins 72 in a stand 74. As seen in Fig. 4(a), the shell 70 has an axially extending bore 76 and a threaded opening 78 in which a solder container 80 is threadably secured. An orifice 82 leads from the opening 78 into the bore 76.

The solder-applying needle 38 extends from a rod 84 that is reciprocally movable within the axial bore 76 and which has defined in it an axially extending solder duct 86 which is in communication with the hollow needle 38. A radially extending orifice 88 of the solder duct 86 communicates with the orifice 82 of the shell 70 when aligned as shown in FIG. 4(b), enabling solder paste to flow from the container 80 into the solder duct 86.

At its other end 90 (FIG. 3), the rod 84 is pivotally connected to a pulley 92, at a position on the pulley 92 eccentric to a pin 94 about which the pulley 92 is rotatably supported on the support 96. As the pulley 92 rotates in the direction of the arrow 98, through a motive power provided either from the gear box 28 via a coupling or belt 32 (FIG. 1), or through its own source of motive power, the rod 84 reciprocates in a manner whereby the needle tip 39 traverses the elliptical path 100 going through points A, B, C, D corresponding to the positions A, B, C, D of the pulley 92. The previously mentioned soldering position 20 corresponds to needle position D. Preferably, the coupling 32 and gear box 28 are configured to synchronize the motions of the gears 14 and 16 and the needles 38 and 40, in a manner whereby the needles 38 and 40 reach the soldering position 20 immediately after the arrival thereat of a next link junction 31, 33, etc.

Each of the gears 14 and 16 is rotated by respective one of the gear boxes 26 and 28 (FIG. 1) which are in turn driven by a motor 34 under the control of a motor controller 36. The motor controller 36 energizes the motor 34 in discrete sequential steps. This sequentially rotates the gears 14 and 16 and serves to rotate and advance the rope chain 10 by the equivalent of one rope chain link, corresponding to the advancement of the gear teeth 18 by one gear tooth.

In operation, at the position A, the needle tip 39 is moving away from the soldering position 20 (FIG. 3). At position B, the orifices 82 and 88 become aligned (FIG. 4(b)), enabling solder paste held under pressure in the hanging solder 102 at the tip 39 of the needle 38. Thereafter, as the pulley 92 traverses through the positions C and D, the needle tip 39 traverses a path that enables it to wipe the solder dab 102 against the link junction 31, 33, etc., then located at the soldering position 20. This completes a single solder-applying cycle.

The soldering mechanism of FIGS. 3, 4(a) and 4(b) is repeated for the needle 40, so that two dabs of solder are simultaneously applied on opposed diametrical sides of the rope chain 10. The amount of solder that is applied is controlled by controlling the pressure of the solder in the container 80 as well as by controlling the dwell time of the pulley 92 at the position B and by careful selection of the cross-sectional sizes of the solder passageways in the rod 84, the needle 38, and orifices 82 and 88.

Another solder-applying mechanism 7 is disclosed in Weinberg et al. and illustrated in FIG. 5(a) to 5(d), and depicts a modified shell or block 110 which is horizontally disposed and reciprocally movable in an opening 112 provided in a fixed base 114. The block 110 has a rear flange 116 and a compressed spring 118 on its outer circumferential surface which is biased to urge the flange 116 rearwardly, against a stop 120. A solder chamber 122 in the forward portion of the block 110 communicates with the threaded opening 124 for the solder container 80 (FIG. 3). The front end of the solder chamber 122 is bounded by a plug 126 (FIG. 5(b)) which supports the hollow needle 38.

Figure 5A:
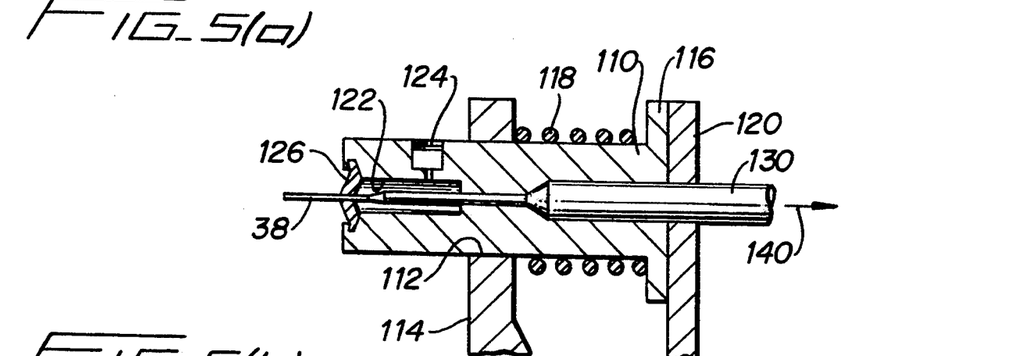
FIGS. 5(a), 5(b), 5(c) and 5(d) are cross-sections of another known needle conveying device, showing successive stages of operation thereof.
Figure 5B:
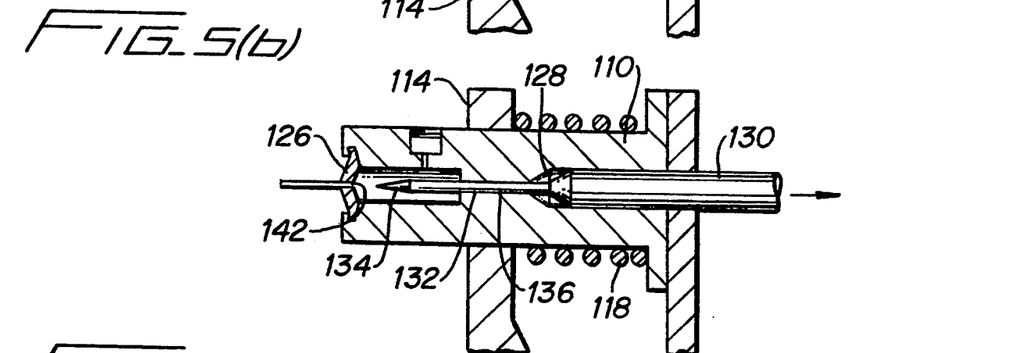

At the rear, the block 110 defines a rear chamber 128 in which a solid ram rod 130 having a solid needle 132 with a sharp tip 134 is reciprocally arranged. The solid needle 132 slides within a connecting passageway 136 that connects the rear and the front chambers 122 and 128 of the block 110.

In operation, initially, as shown in FIG. 5(a), the rod 130 begins to move to the right in the direction of the arrow 140 while the block 110 remains stationary. This causes the tip 134 of the solid needle 132 to retreat from the entrance point 142 into the hollow needle 38, allowing solder paste to flow from the container (not shown) via the solder chamber 122 into the needle 38.

Figures 5C, 5D:
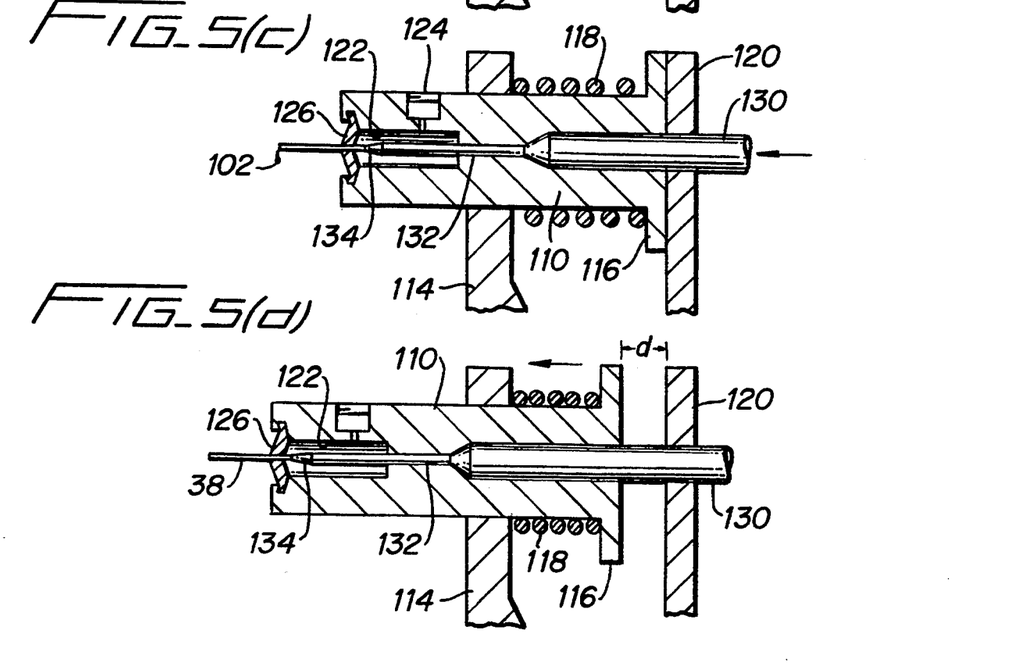

In the next step (FIG. 5(c)), the ram rod 130 reverses direction as shown, the entrance of the solid needle 132 into the chamber 122 causing some of the solder paste to issue from the hollow needle 38, creating a solder dab 102 the size of which is determined by the mass size of the solid needle 132 and the degree of penetration of the tip 134 into the hollow needle 38.

In the final step (FIG. 5(d)), continued forward movement of the rod 130 serves to push the entire block 110 forward by a distance "d" in a manner which enables the tip of the needle 38 to reach the soldering position 20 and apply the solder dab 102 to the rope chain 10.

One difficulty encountered with the above-described soldering machine is the general inability to operate the soldering-machine unattended for an extended period of time. Because of the necessity to manually heat a portion of the rope chain 10 at relatively short intervals of time, an operator must check the soldering machine at regular intervals to determine if the rope chain 10 is ready to be heated, and if it is ready to be heated, spend three to five minutes of time to heat that portion of the rope chain which contains unheated solder. In addition, since the heating process is performed manually, there is the risk that such heating may be performed improperly, thus resulting in a rope chain whose links are not properly joined or a rope chain that is weak or deformed because of overheating.

Weinberg et al. discloses a heater system which allegedly overcomes the above-described difficulties. As shown in FIG. 1, a heater 48 is coupled to a heater controller 50 which provides electrical power to the heater 48 and may be linked to the motor controller 36 by an electrical line 52 by which it may be possible to disable the heater/controller 50 when the motor 34 has ceased running, thus preventing overheating of the rope chain 10. In addition, an input from the heater controller 50 to the motor controller 36 may be used to disable the motor 34 until such time as the heater 48 has reached a predetermined temperature.

One difficulty encountered with the above-described heating system is the general inability in maintaining an induction heater 48 which is capable of properly heating the rope chain such that the solder will flow and properly set, joining the links, without overheating that portion of the rope chain 10 which passes through the induction heater 48. As it is known, the type of solder used with gold rope chain, for example, contains a large percentage of gold whereby even slight overheating by induction heater 48 will damage the rope chain. In addition, should the induction heater 48 fail and therefore not properly heat the rope chain 10, the solder applied to the rope chain 10 will not flow, thereby providing a rope chain that requires manual heating as described above. Further, should motor 34 fail, thus resulting in the rope chain not advancing, heater 48 is dependent upon heater controller 50 and motor controller 36 to prevent overheating of the rope chain 10, whereby this circuitry is complex and may easily fail. Still further, heater 50 requires a period of time to heat-up in order to reach a predetermined temperature thus resulting in a wait period before the soldering machine is functional each time the soldering/heating operation is halted.

OBJECTS AND SUMMARY OF THE INVENTION

Therefore, it is an object of the present invention to provide an improved soldering machine for rope chain which overcomes the shortcomings of the above described soldering machines.

Another object of the present invention is to provide an improved soldering machine for rope chain which is completely automatic.

A further object of this invention is to provide an improved soldering machine for rope chain which automatically and effectively heats the solder applied to the rope chain to cause the solder to flow and set and thus join the links to one another.

An additional object of the present invention is to provide an improved soldering machine for rope chain which will not overheat the rope chain when the rope chain does not advance.

Still another object of this invention is to provide an improved soldering machine for rope chain whose heating system for causing the solder to flow and set is not unduly complicated.

Various other objects, advantages and features of the present invention will become readily apparent to those of ordinary skill in the art, and the novel features will be particularly pointed out in the appended claims.

In accordance with the present invention, an improved soldering machine for automatically soldering links of a chain is provided in which the links are disposed adjacent one another and define link junctions. The improved soldering machine holds the chain in position to enable the link junctions to be soldered. A soldering device applies solder paste to the chain at the link junctions by feeding the solder paste through a hollow needle having a needle tip wherein the needle tip traverses a predetermined path and contacts the chain over a portion of that predetermined path. The improved soldering machine has a heater which traverses a cyclical path which is dependent upon the position of the needle tip and heats the solder applied to the chain over a portion of that cyclical path.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Referring now to the drawings, FIGS. 1–5 illustrate the arrangement of a soldering machine for rope chain and comprise the soldering machine for which the improvement of the present invention is directed. FIGS. 1–5 are described above and in Weinberg et al., U.S. Pat. No. 5,115,959, the disclosure of which is incorporated herein by reference.

Figure 6:
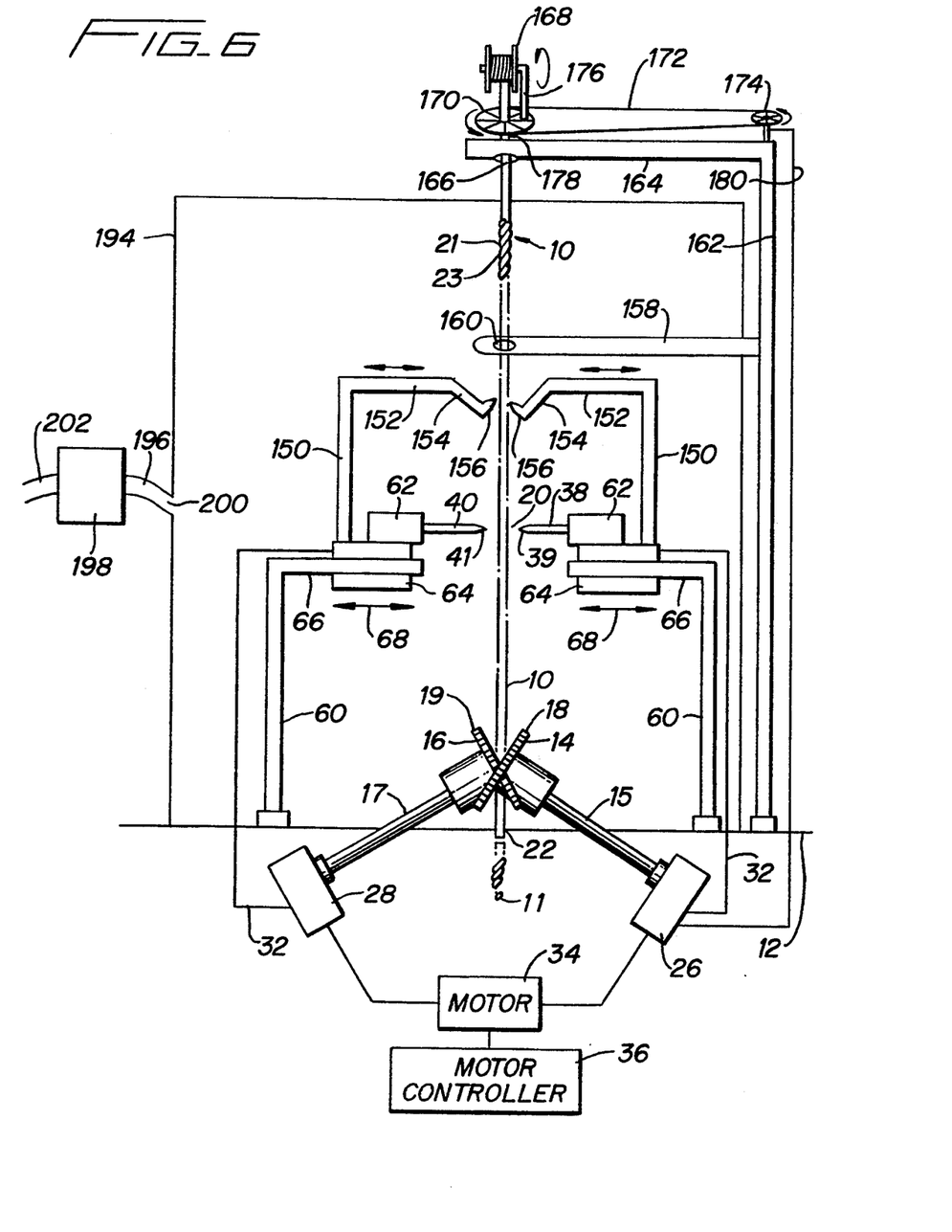
FIG. 6 is a schematic block diagram of an improved soldering machine in accordance with the present invention.

FIG. 6 shows the improved soldering machine containing the automatic heating system which automatically causes the solder to flow and set, joining the links to one another, in accordance with the present invention. The improved soldering machine with respect to the advancement of the rope chain 10 and the soldering mechanism is described above and therefore, this discussion is directed to the improved heating system of the present invention and a rope chain pulling system.

As shown in FIG. 6, the heating system of the present invention comprises L-shaped brackets 150, rods 154 and heaters 156. In addition, a chain holder bracket 158 is utilized to secure the rope chain 10 in position to enable the solder that has been applied to the rope chain 10 to be heated.

For this heating system, the L-shaped brackets 150 are secured at one end thereof to the reciprocally movable blocks 64, which, as described above, slide on the short arms 66 of the brackets 60 in the directions indicated by the arrows 68. Rods 154 are coupled to the arms 152 of the brackets 150 and heaters 156 are attached to the rods 154 such that the heaters 156 heat the rope chain 10 when the reciprocally movable blocks 64 are in a position closest to the rope chain 10. In a preferred embodiment of the present invention, two heaters 156 are located on diametrically opposed sides of the rope chain 10 such that the rope chain 10 is evenly heated over its entire surface.

Since slight variations of the position of the rope chain 10 effect the heating of the rope chain 10, it is necessary for the chain holder bracket 158 to secure the rope chain 10 in place by having the rope chain 10 feed through a hole 160 in the chain holder bracket 158. The chain holder bracket 158 is secured to bracket 162 which is secured to the platform 12 of the improved soldering machine of the present invention. Chain holder bracket 158 may instead be secured to the platform 12 by a member 188 (FIG. 8) solely used to secure the chain holder bracket 158 such that adjustments to the chain holder bracket 158 can be easily performed. The size of the hole 160 of chain holder bracket 158 is preferably adjustable to allow for the soldering and heating of various thicknesses of rope chain.

After the rope chain 10 has passed through the hole 160 of the chain holder bracket 158, the rope chain 10 is stored on a take-up reel 168 which also provides for pulling the rope chain 10 up as it is supplied by gears 14 and 16 (described above with reference to FIG. 1). The take-up reel 168 is coupled to a pulley 170 by a coupler 176 and may be powered by an internal source (not shown) or by a belt (not shown) attached to the pulley 170. The pulley 170 is attached to an L-shaped bracket 162 by a coupler 178 and provides for the rotation of the take-up reel 168 enabling the take-up reel 168 to pull the rope chain 10 while maintaining its taut while it is being slowly rotated by the feeding mechanism of gears 14 and 16. The L-shaped bracket 162 is secured at one end thereof to the platform 12. The pulley 170 is driven by a belt 172 connected to a pulley 174, the pulley 174 being driven by a belt or power line 180 from the gear box 26.

Figure 7:
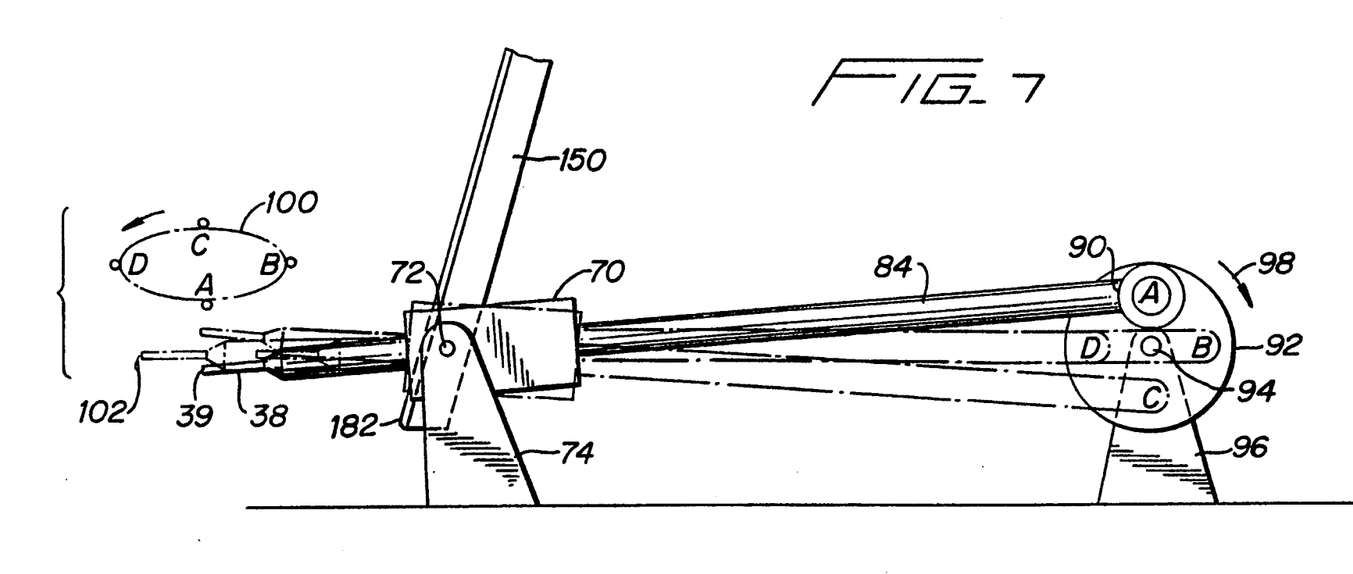
FIG. 7 is a side view of a portion of the moving mechanism for a solder-applying and heating device of the present invention.

FIG. 7 illustrates an expanded side view of the moving mechanism for the solder-applying and heating system of the present invention. As previously described, the solder-applying needle 38 having a needle tip 39 extends from a cylindrical rod 84 that is reciprocally movable within the axial bore 76 (FIG. 4(a)) of the shell 70. Solder paste flows from a solder container (not shown in FIG. 7) into a solder duct 86 (FIG. 4(a)) when a pulley 92 traverses through position B as described above with reference to FIGS. 4(a) and 4(b).

When the pulley 92 traverses through positions A, B, C and D, the rod 84 reciprocally moves through the shell 70 causing the shell 70 to pivot on the hinge pin 72. As the shell 70 pivots, the L-shaped bracket 150 (partially shown), which is secured to the shell 70 at portion 182, also pivots on the hinge pin 72.

Figure 8:
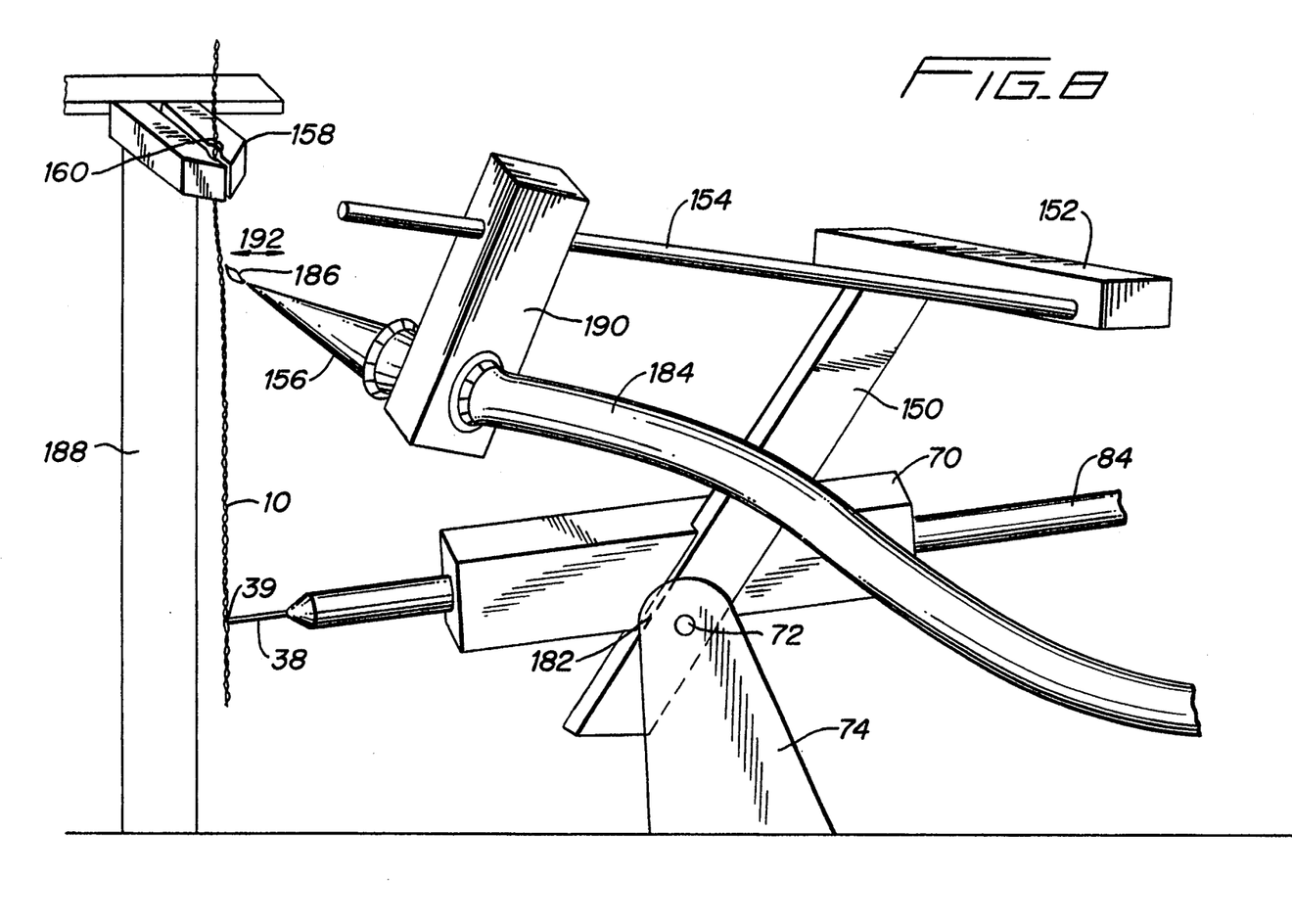
FIG. 8 is an enlarged three dimensional view of a portion of the solder-applying and heating device of the present invention.

FIG. 8 is an enlarged three dimensional view of the soldering and heating systems of the present invention and more fully illustrates the operation of the automatic heating system. As shown, the L-shaped bracket 150 is secured to the shell 70 at a portion 182 of the L-shaped bracket 150 wherein the shell 70 and the L-shaped bracket 150 pivot on the hinge pin 72. The rod 154 is secured and extends from the arm 152 of the L-shaped bracket 150. A heater 156 is coupled to the rod 154 by a heater holding member 190 such that the heater 156 is directed to provide heat to the rope chain 10 for at least one portion of the pivot cycle of the L-shaped bracket 150. That is, the heater 156 heats the rope chain 10 when the pulley 92 (FIG. 7) is at position A, B, C or D wherein a heating cycle consists of the traversing of the pulley 92 through positions A, B, C and D. In a preferred embodiment, the heater 156 heats the rope chain 10 only when the pulley 92 is at position D, when solder is applied to the rope chain 10 by the needle tip 39 of the solder-applying hollow needle 38. When the pulley 92 is at positions A, B and C, the heater 156 is displaced at a position which is far enough away from the rope chain 10 such that the rope chain 10 is not being heated.

In one embodiment of the present invention, heater 156 is a nozzle which provides an adjustable gas flame 186, the gas flame 186 moving in the direction of the arrow 192 as the L-shaped bracket 150 pivots on the hinge pin 72. Since the position of the heater holding member 190 is adjustable on the rod 154, the path of the gas flame 192 is easily adjustable to provide the desired amount of heating of the rope chain 10 for each pivot cycle of the L-shaped bracket 152 on the hinge pin 72.

The gas flame 186 is supplied to the rope chain 10 at a slightly upward direction wherein an inflammable gas which produces the gas flame 186 is supplied by a flexible tube 184 from an external source (not shown).

The second heating mechanism shown in FIG. 6, consisting of the second L-shaped bracket 150, the second rod 154 and the second heater 156, operate in a manner similar to that described above, so that two heaters 156 simultaneously heat the same portion of the rope chain 10 but on diametrically opposed sides thereof. The amount of heat applied is easily controlled by controlling, for example, the size of the gas flame as well as by controlling the dwell time of the pulley 92 at the position B and by careful placement of the heaters 156.

As previously described, the heater 156 heats the rope chain 10 during a portion of the pivot cycle of the L-shaped bracket 150, and in a preferred embodiment, the rope chain 10 is heated when the pulley 92 is positioned at only one of the positions A, B, C or D (FIG. 7). In the event that the feeding mechanism or the rope chain pulling mechanism (previously described) fail, causing the rope chain 10 to remain stationary throughout multiple rotations of the pulley 92, the cyclical motion of the heater 156 prevents the rope chain 10 from overheating and becoming damaged because the rope chain 10 is heated for only a portion of each cycle. In addition, should the pulley 92 fail such that the heater 156 remains stationary, it is more likely than not that the rope chain 10 is not being heated by the heater 156 at the moment the failure occurs.

Returning back to FIG. 6, an enclosure 194 may be provided to contain any harmful gases entering the air which result from the process of heating the solder contained on the rope chain 10. In the preferred embodiment, the enclosure 194 is a light-weight plastic tank containing a door (not shown) to allow for easy access to various portions of the improved soldering machine of the present invention. In addition, a tube 196 and a pump 198 provide for the easy removal of the gases that have accumulated in the enclosure 194. The tube 196 extracts the gases from the enclosure 194 through a hole 200 of the enclosure 194 by means of a pump 198 which forces the gases out an external tube 200 to a gas collecting device (not shown) or the like.

While the present invention has been described above with respect to a rope chain, the same is applicable to other chains, for example to chains in which rings are packed following one another. Moreover, the type of heater used may be of a type different than gas flames.

Therefore, it is intended that the appended claims be interpreted as including the embodiments described herein, the alternatives mentioned above, and all equivalents thereto.

What is claimed is:

1. An improved soldering machine for automatically soldering links of a chain, in which the links are disposed adjacent one another and define link junctions, said machine having means for holding the chain in position for enabling the link junctions to be soldered, soldering means, including solder-applying means for applying solder paste to the chain at said link junctions, said solder-applying means including a hollow needle having a needle tip and means for feeding solder paste through said needle tip, and means for causing the needle tip to traverse a predetermined path with said needle tip contacting said chain over a portion of said predetermined path, the improvement comprising:

heating means for heating solder applied by said soldering means, said heating means coupled to said means for causing the needle tip to traverse a predetermined path to cause the heating means to traverse a cyclical path, said heating means heating said solder applied by said soldering means during a portion of said cyclical path.

2. The improved soldering machine of claim 1, wherein said heating means heats said solder applied by said soldering means when said needle tip contacts said chain over said portion of said predetermined path.

3. The improved soldering machine of claim 1, wherein the means for causing the needle tip to traverse a predetermined path includes a rotatable pulley, a pivotally mounted shell, and a rod reciprocally movable through the shell by the pulley, said hollow needle being coupled to said arm and wherein the heating means includes a member fixedly engaged to said pivotally mounted shell and a heater coupled to said member.

4. The improved soldering machine of claim 3, wherein the member fixedly engaged to the pivotally mounted shell comprises an L-shaped bracket engaged to the pivotally mounted shell and a rod coupled to said L-shaped bracket, and wherein the heater is coupled to said rod.

5. The improved soldering machine of claim 4, wherein the L-shaped bracket has first and second arms, said first arm engaged to the pivotally mounted shell, and wherein the rod is coupled to said second arm of the L-shaped bracket.

6. The improved soldering machine of claim 1, wherein the solder-applying means includes a second hollow needle having a needle tip and second means for causing said needle tip of said second hollow needle to traverse a second predetermined path, said needle tip of said second hollow needle contacting said chain over a portion of said predetermined path, and wherein said heating means includes second heating means coupled to said second means for causing to cause said second heating means to traverse a cyclical path, said second heating means heating said solder applied by said soldering means during a portion of said cyclical path of said second heating means.

7. The improved soldering machine of claim 6, wherein said heating means and said second heating means are disposed at opposite sides of the chain when heating the solder applied by the soldering means.

8. The improved soldering machine of claim 1, further including means for synchronizing the feeding means, the solder-applying means and the heating means to one another.

9. The improved soldering machine of claim 1, wherein the heating means includes a nozzle for providing an inflammable gas therethrough and means for supplying said inflammable gas to said nozzle, said inflammable gas heating the solder applied by the soldering means during said portion of said cyclical path.

10. The improved soldering machine of claim 1, further comprising means for holding the chain in position for enabling the solder applied by the soldering means to be heated.

11. The improved soldering machine of claim 1, further comprising feeding means for feeding the chain in a forward direction and in a manner which places successive ones of said link junctions at a solder position and then in a heating position, the feeding means including at lease one rotatable gear which is disposed to engage and advance the links.

12. The improved soldering machine of claim 1, further comprising means for containing gases that result from heating the solder.

13. The improved soldering machine of claim 12, wherein the means for containing gases includes enclosure means for preventing the gases from escaping and pump means for removing the gases from the enclosure means.

* * * * *